UNITED STATES PATENT OFFICE.

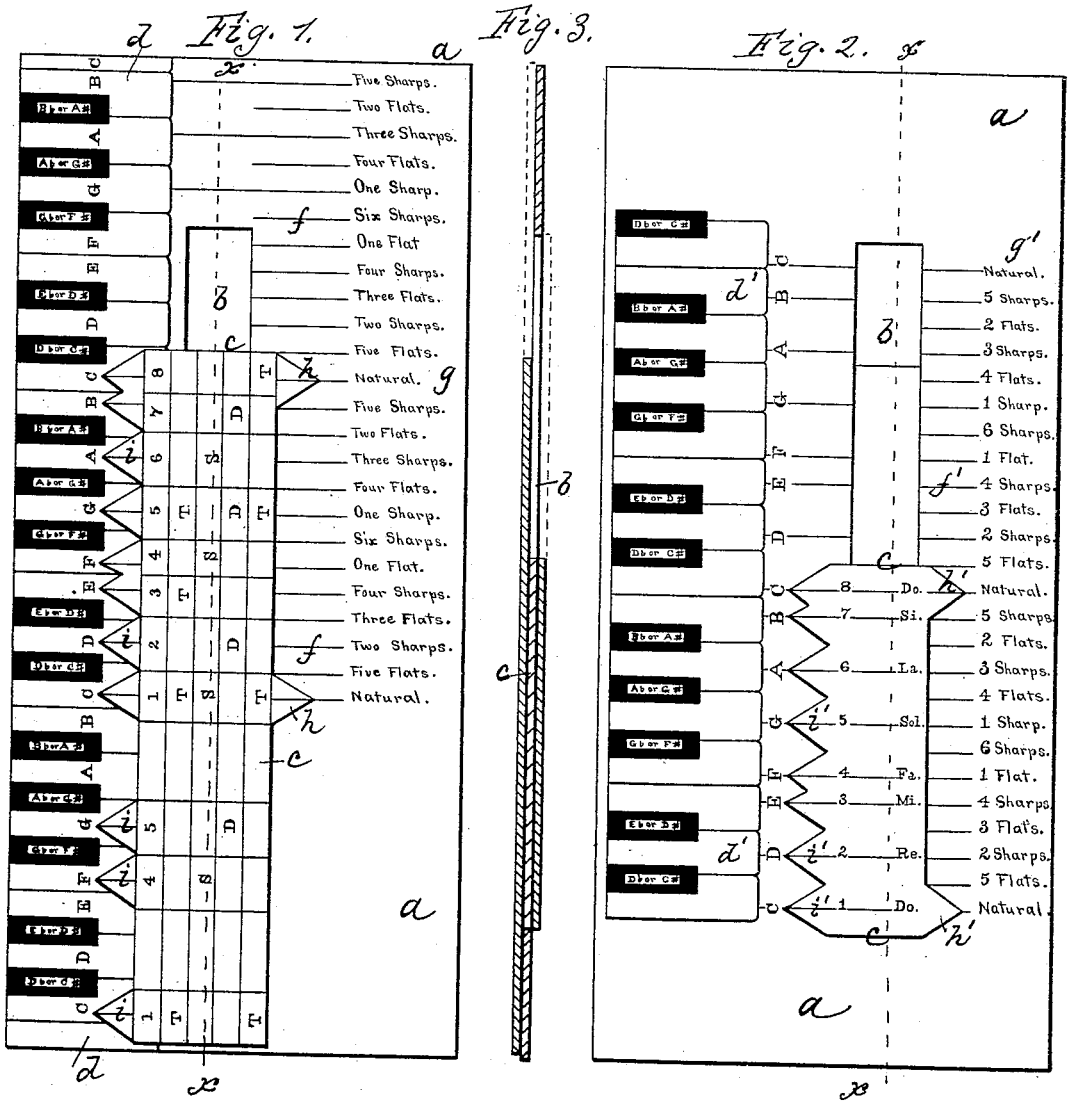

JOHN MAGGS, OF CANANDAIGUA, NEW YORK.

MUSICAL INDICATOR.

SPECIFICATION forming part of Letters Patent No. 395,067, dated December 25, 1888.

Application filed August 17, 1888. Serial No. 283,049. (No model.)

*To all whom it may concern:*

Be it known that I, JOHN MAGGS, of Canandaigua, in the county of Ontairo and State of New York, have invented a certain new and useful Improvement in Musical Indicators; and I do hereby declare that the following is a full, clear, and exact description of the same, reference being had to the drawings accompanying this application.

My invention relates to that class of musical indicators in which a flat sheet is used, with a slide moving up and down thereon, said parts being marked with musical characters to indicate to the eye the different changes to be made to produce the desired effect.

The object of my present invention is to indicate to the eye the changes necessary to be made to produce on the key-board of a musical instrument the musical chords in the different keys, the tonic, sub-dominant, and dominant chords, making forty-eight different changes, as here given; also what keys to use for the diatonic scale in each key.

The invention further consists in the combination on the same sheet (one on the front and the other on the back) of two indicators, one indicating the chords, as above described, the other the transposition of the scale, and a single slide common to both indicators, all as hereinafter described.

In the drawings, Figure 1 is a front face view of the device. Fig. 2 is a rear face view of the same. Fig. 3 is a longitudinal cross-section in line $x\, x$ of Figs. 1 and 2.

$a$ indicates the flat sheet on which the indicators are applied, the same being of any desired size and shape and provided with a longitudinal slot or opening, $b$, to allow proper movement of the slide resting therein.

$c$ is the slide, consisting of a device that runs up and down in the slot $b$, and is provided with two overlapping faces that run, respectively, on opposite sides of the scale. It is conveniently made of three thicknesses, the narrow one being in the center and running in the slot, while the wider ones are attached thereto and run outside the scale on opposite sides.

Figure 1 shows the chord-indicator. At the left is marked a fac-simile of a portion of a key-board of a piano or organ, as shown at $d$. At the right are marked lines $f$, indicating the chromatic scale, and outside this are marked the names of the key-signatures, as shown at $g$. The slide is provided with lines, letters, figures, and pointers, as shown. The figures "1," "2," "3," &c., pertain to the diatonic scale. The letters relate to the chords, "T" for tonic, "S" for sub-dominant, and "D" for dominant. The lines serve the purpose of keeping each separate and enabling them to be distinguished. The figures are arranged in the first column at the left, and the series of letters "T" "S" "D" "T" in successive columns and in the positions shown in the drawings. The left half of the slide relates to the bass, for which the left hand is used, and the right half to the other parts, for which the right hand is used. On the right of the slide are two pointers, $h\, h$, which tally with and indicate the key-signatures $g$ at the right of the scale. At the left of the slide is a series of pointers, $i\, i\, i$, which register with the keys and indicate tones.

The object is to produce the chords in different keys. For example, take the key of C, which is the natural. Place the slide so that the pointers at the right come opposite the key-signature "natural." For the first chord take the tonic, which is placed in the left-hand column of letters "T" on the slide. Strike all the keys which come opposite these letters and the chord will be produced. In the same manner, by striking all the keys opposite "S" the sub-dominant chord will be produced, and so on through all the series. In the same manner the chords in all the different keys may be produced by adjusting the slide to the desired key-signature.

On the opposite or back face of the scale-indicator is a similar fac-simile of the key-board $d'$, chromatic scale $f'$, and key-signatures $g'$. The slide (which is of less length on this side) is provided with the figures "1," "2," "3," &c., also with the musical characters "do," "re," "mi," "fa," "sol," "la," "si," "do," representing the diatonic scale. The slide is provided at the right with the pointers $h'\, h'$, that tally with the key-signatures, and at the left with the series of pointers $i'\, i'\, i'$, which indicate tones. The pointers $h$ and $h'$, on opposite faces of the indicator, register with the same key-signatures at any adjustment of the slide. Therefore both indicators indicate the same key at the same time.

The object of the indicator shown in Fig. 2 is to exhibit to the eye in a material form the different transpositions in music, while the indicator shown in Fig. 1 is to indicate the different keys to strike to produce chords. The whole is arranged in one device, with a single slide, being therefore in simple and convenient form.

Having described my invention, what I claim as new, and desire to secure by Letters Patent, is—

1. In a musical indicator, the combination, with a sheet provided with a fac-simile of a key-board on one side, and the key-signatures' names on the other, of a slide provided with pointers on one edge registering with the key-signatures, and pointers on the other edge indicating tones, said slide also provided with the letters "T," "S," "D," "T," indicating the tonic, sub-dominant, and dominant chords on the key-board at whatever position the slide is adjusted, as herein shown and described.

2. In a musical indicator, the combination of a sheet having on each of its faces the fac-simile of a key-board on one side and the key-signatures' names on the other, and a single slide common to both scales provided with pointers on one edge, the register with the key-signatures and pointers on the other edge that indicate tones, one face of the sheet forming a chord-indicator and the other a transposition-indicator, as herein shown and described.

In witness whereof I have hereunto signed my name in the presence of two subscribing witnesses.

JOHN MAGGS.

Witnesses:
C. W. BROWN,
R. R. POTEET.